United States Patent [19]

Kawamoto et al.

[11] Patent Number: 4,703,945
[45] Date of Patent: Nov. 3, 1987

[54] ACTUATOR FOR STEERING THE REAR WHEELS IN FRONT AND REAR WHEEL STEERING DEVICE FOR VEHICLE

[75] Inventors: Yoshimichi Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 822,008

[22] Filed: Jan. 24, 1986

[30] Foreign Application Priority Data

Jan. 24, 1985 [JP] Japan .................................. 60-011834
Jan. 24, 1985 [JP] Japan .................................. 60-011835

[51] Int. Cl.⁴ .............................................. B62D 5/06
[52] U.S. Cl. ...................................... 280/91; 180/143; 180/236
[58] Field of Search .................. 280/91; 180/141, 142, 180/143, 234, 236

[56] References Cited

U.S. PATENT DOCUMENTS

| 3,075,784 | 1/1963 | Beyerstedt | 280/91 |
| 3,140,101 | 7/1964 | Sheppard | 280/91 |
| 3,903,983 | 9/1975 | Yeske | 280/91 |
| 4,313,514 | 2/1982 | Furukawa et al. | 280/91 |

*Primary Examiner*—John J. Love
*Assistant Examiner*—Kenneth R. Rice
*Attorney, Agent, or Firm*—Lyon & Lyon

[57] ABSTRACT

An actuator for steering the rear wheels in front and rear steering device for a vehicle in which the steering angle of the rear wheels can be manually neutralized should the actuator fail with the rear wheels steered to a certain angle. The actuator may be a type which either directly steers the rear wheels following command from control means or varies the state of means for setting up the steering angle ratio of the rear wheels. In either case, a preferably detachable handle may be engaged to an output end of power means of the actuator. Thus, the situation in which the rear wheels are frozen at a certain steering angle and the driving of the vehicle becomes difficult is safely avoided.

7 Claims, 8 Drawing Figures

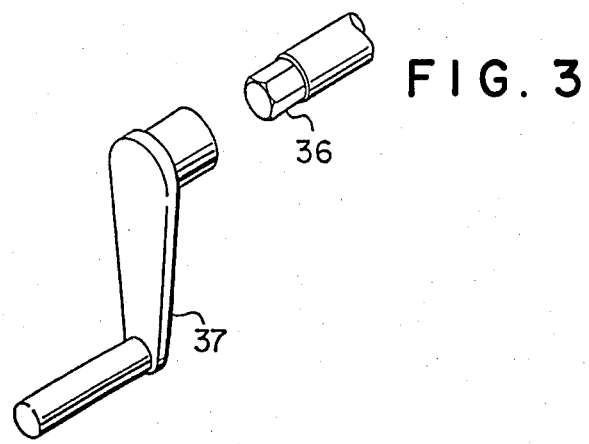
FIG. 3
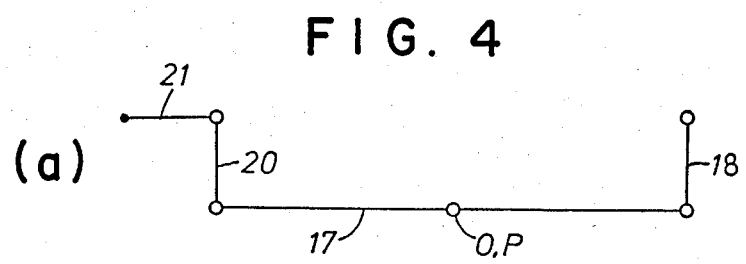
FIG. 4
(a)
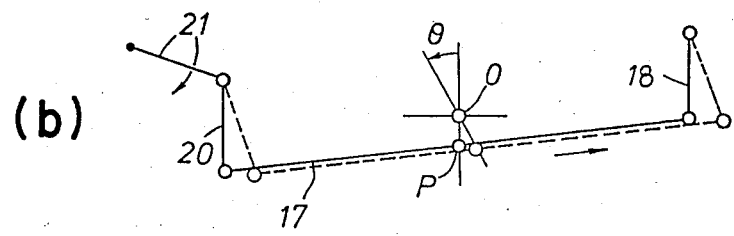
(b)
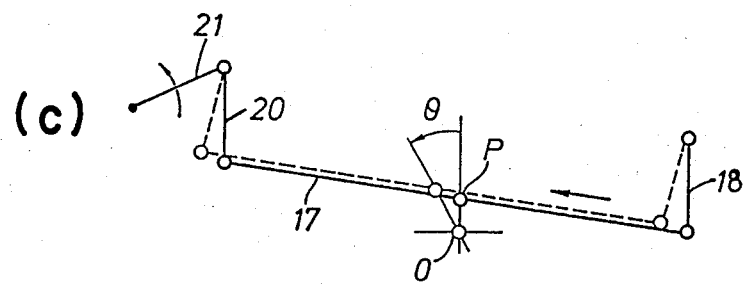
(c)

ACTUATOR FOR STEERING THE REAR WHEELS IN FRONT AND REAR WHEEL STEERING DEVICE FOR VEHICLE

FIELD OF THE INVENTION

This invention relates to an actuator for controlling a steering angle or a steering angle ratio of rear wheels relative to front wheels in a front and rear wheel steering device for a vehicle which variably controls the steering angle of the rear wheels according to certain conditions.

DESCRIPTION OF THE PRIOR ART

There have been a number of proposals to provide front and rear wheel steering devices particularly in the form of four wheel steering devices. For instance, Japanese Patent Application No. 53-163678 (Japanese Patent Laying-Open Publication No. 55-91457) corresponding to U.S. Pat. No. 4,313,514 filed by the Assignee of the present application, proposes a front and rear wheel steering device for a vehicle which steers the rear wheels in relation with the steering of the front wheels in the same phase relationship in high speed range and in the opposite phase relationship in low speed range. The steering angle ratio may be a continuous function relative to the vehicle speed. In this connection, the object of the control may be either the steering angle ratio of the rear wheels relative to the front wheels or the steering angle of the rear wheels itself.

Thus, a continuous control of the steering angle or the steering angle ratio of the rear wheels is performed according to this continuous function so that the function of the steering device may be favorable in both high speed and low speed ranges. Specifically, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn are substantially improved with the additional advantage of improving the dynamic lateral response of the vehicle in high speed range.

However, in such a front and rear wheel steering device, if the control of the steering angle ratio is not properly performed for instance due to freezing of the steering angle ratio, the steering angle of the rear wheels may have substantial errors from an acceptable range of steering angle.

Generally speaking, in a front wheel steering device, the reaction which the front wheels receive from the road surface is allowed to be transmitted to the steering wheel so that the driving of the vehicle may be facilitated by obtaining a force which tends to return the front wheels to their straight positions from the caster angle given to the front wheels. However, as for the rear wheels, such action is not only unnecessary but may cause the inconvenience that the motion of the vehicle may be affected by interferences such as the irregularities of the road surface when the rear wheels are steered. Particularly in such a case, should the actuator fail for any reason, the rear wheels will be locked or frozen in the steered state and the driving of the vehicle may become extremely difficult.

SUMMARY OF THE INVENTION

In view of such inconveniences of the prior art, a primary object of this invention is to provide a manual means to restore an actuator for controlling the steering angle of the rear wheels to a neutral state.

Another object of the present invention is to provide such a manual means which will not hamper the normal action of the actuator.

According to the present invention such objects are accomplished by providing an actuator for controlling a steering angle of rear wheels relative to front wheels in a front and rear wheel steering device for a vehicle which variably controls the steering angle of the rear wheels according to certain conditions comprising: means for manually neutralizing the steering of the rear wheels.

According to a certain aspect of the present invention, the actuator drives a device for determining the steering angle ratio of the rear wheels relative to the front wheels.

Thus, by adding a manual steering angle ratio setting up means to a device for determining the steering angle ratio of the rear wheels, the steering angle ratio of the rear wheels may be restored for instance to zero even when the proper control of the steering angle ratio of the rear wheels is impossible.

According to another aspect of the present invention, the actuator directly steers the rear wheels.

Thus, by adding a manual steering means to the actuator for steering the rear wheels, the rear wheels may be restored to their neutral positions even when the proper control of the steering angle of the rear wheels has become impossible.

BRIEF DESCRIPTION OF THE DRAWINGS

Such and other objects and advantages of the present invention will be better understood with reference to the following description and the appended drawings in which:

FIG. 3 is a magnified perspective view of a part of FIG. 2;

FIG. 4 (a), (b) and (c) are skeleton diagrams of the rear wheel steering system of FIG. 2, illustrating the working principle thereof;

DETAILED DESCRIPTION OF THE PREFERRED EMBODIMENTS

Now embodiments of this invention are described in the following with reference to the appended drawings.

Figure 1:
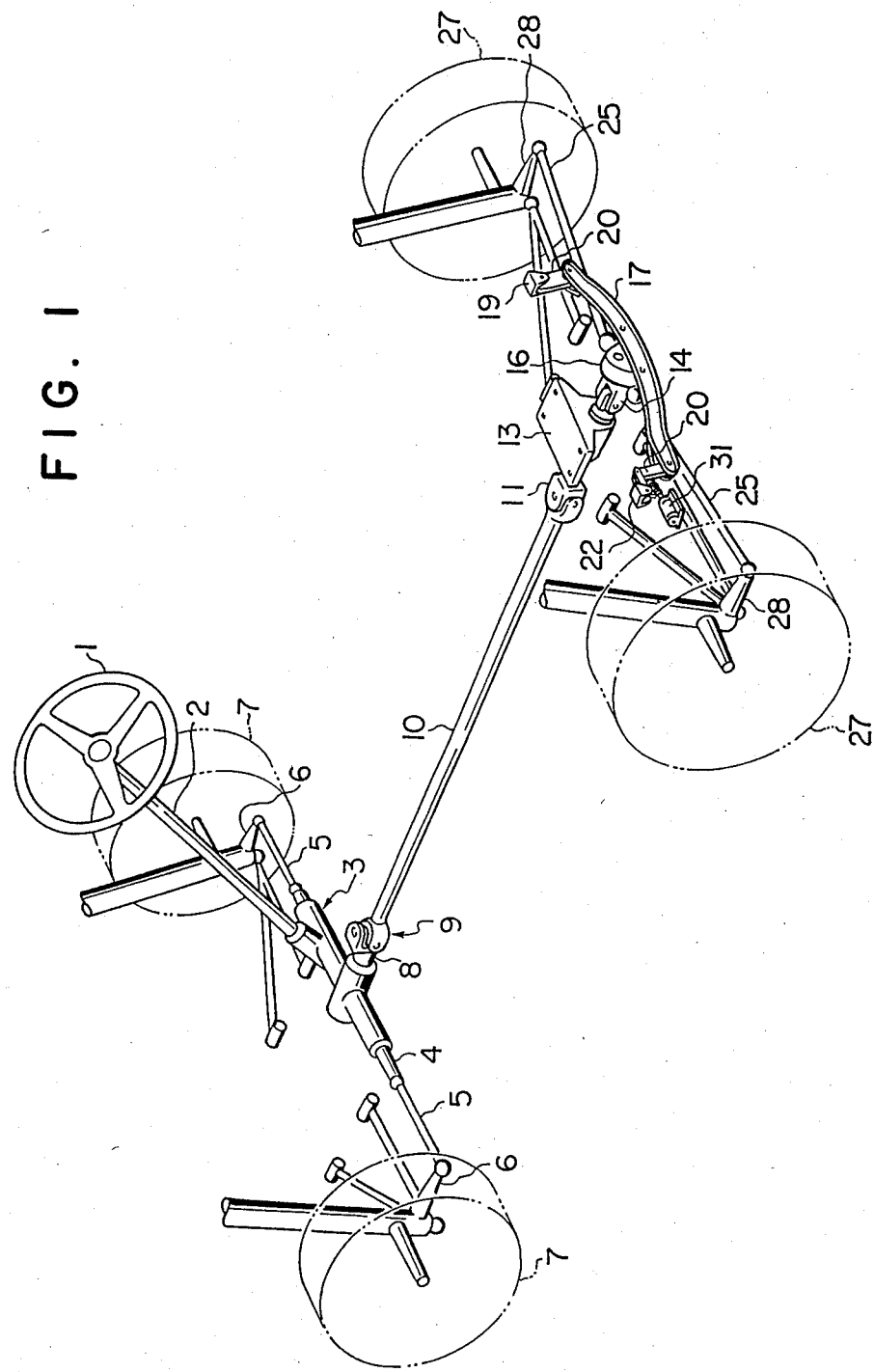
FIG. 1 is a perspective view showing the general basic structure of a vehicle provided with an actuator for a front and rear wheel steering device according to this invention with the chassis of the vehicle removed.

As shown in FIG. 1, a steering column shaft 2 of a steering wheel 1 is joined into a rack and pinion type gear box 3, and a pair of tie rods 5 are connected to the two ends of a rack shaft 4 which meshes with a pinion gear (not shown in the drawings) integrally attached to the lower end of the steering column shaft 2. To the external ends of the tie rods 5 are connected a pair of knuckle arms 6 which support right and left front wheels 7, respectively, in such a manner that the front wheels 7 can be steered to the direction determined by the steering wheel 1 in the known manner.

A pinion shaft 8 extends from the gear box 3 to the rearward direction and an elongated linkage shaft 10 is connected to the rear end of the pinion shaft 8 by way of a universal joint 9. The pinion shaft 8 is provided with a pinion gear (which is not shown in the drawings) which meshes with the rack shaft 4. And an input shaft 12 (FIG. 2) is connected to the rear end of the linkage shaft 10 by way of another universal joint 11. This input shaft 12 is disposed along the laterally central line of the rear part of the vehicle and is rotatably supported by a bearing bracket 13 as best shown in FIG. 2.

Figure 2:
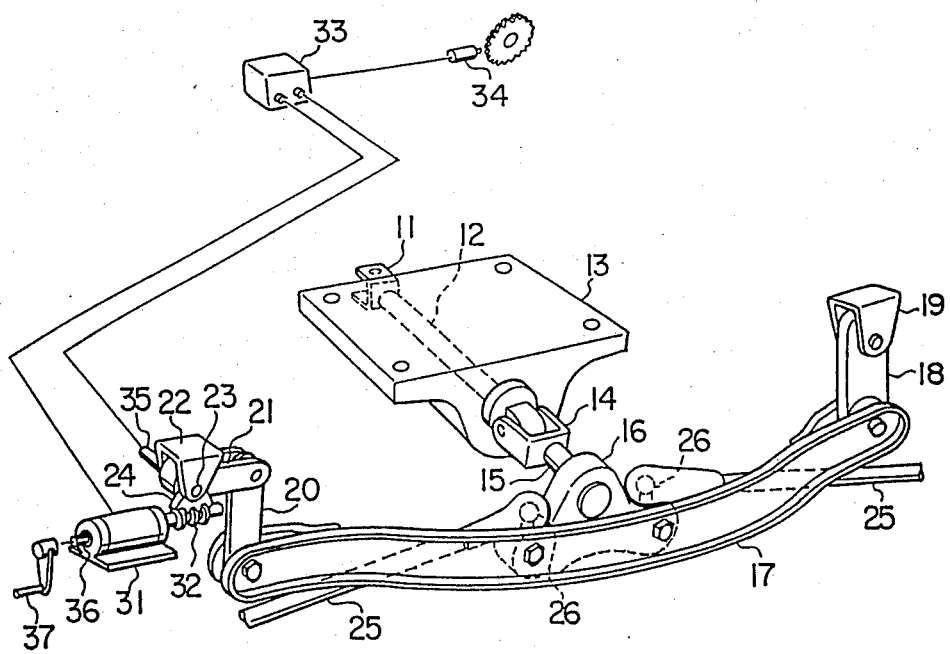
FIG. 2 is a magnified perspective view of a rear wheel steering system of the embodiment of FIG. 1.

Further, a swing shaft 15, which is described in greater detail in FIG. 2, is connected to the rear end of the input shaft 12 by way of a clevis 14, and a joint member 16 is loosely fitted over a middle portion of the swing shaft 15. The two lateral ends of the joint member 16 are connected to tie rods 25 by way of ball joints 26 respectively, and the joint member 16 is fixedly supported by a middle part of an arm member 17 which is arranged along the widthwise direction of the vehicle.

One end of the arm member 17 is connected to the vehicle body by way of a link member 18 and a link bracket 19 while the other end of the arm member 17 is connected to the vehicle body by way of link members 20 and 21 and a link bracket 22 in such a manner that the arm member 17 may be able to swing in a vertical plane which is perpendicular to the longitudinal direction of the vehicle. A pivot shaft 23 of the link member 21 on the side of the braket 22 can rotate integrally with the link member 21. The external ends of the tie rods 25 are connected to knuckle arms 28 which support rear wheels 27 as shown in FIG. 1.

A motor 31 is mounted in a part of the vehicle body located on the side of the other end of the arm member 17 and an output shaft of the motor 31 is fixedly provided with a worm gear 32 which in turn meshes with a sector gear 24 integrally mounted to the pivot shaft 23 of the link member 21. Thus, the rotation of the motor 31 will cause the rotational motion of the arm member 17.

According to this embodiment, since the advance angle of the worm gear 32 is selected to be smaller than the friction angle thereof, external force applied to the rear wheels will not drive the worm gear 32 by way of the sector gear 24 and the steering angle ratio of the rear wheels will not be affected by external factors such as the irregulatities of the road surface.

Furthermore, so that the steering angle ratio may be restored, for instance manually, to a neutral position even when the steering angle ratio is fixed to a certain value for instance due to a failure of the motor 31 for any reason, a hexagonal cross-section portion 36 is provided at an end of the output shaft of the motor 31, as best shown in FIG. 3, and the steering angle ratio of the rear wheels may be fixed to zero by engaging a separately stowed crank handle 37 with the hexagonal portion 36 and manually turning the output shaft of the motor 31.

It goes without saying that other engagement means may be used in place of the hexagonal portion 36. And, the crank handle 37 may also serve as a handle of a car jack.

Further, the vehicle is provided with a computer 33 which receives signals from a vehicle speed sensor 34 for detecting the vehicle speed and a position sensor 35 which detects the position of the pivot shaft 23 of the link member 21 and sends an appropriate control signal to the computer 33 according to the vehicle speed to control the rotation of the motor 31.

When the pivot point P of the joint member 16 coincides with the center O of the input shaft 12 as shown in FIG. 4 (a), the input shaft 12 and the swing shaft 15 rotate in a coaxial manner, and therefore the joint member 16 will not laterally swing and the tie rods 25 remain stationary so that only the front wheels 7 are steered and the rear wheels 27 are not steered at all, in the same manner as in a conventional vehicle.

When the link member 21 is downwardly rotated by the rotation of the motor 31 by way of the worm gear 32 and the sector gear 24 meshing therewith, the arm member 17 inclines with its left end down as shown in FIG. 4 (b). Due to this inclination of the arm member 17, the pivot point P is located below the axial center O and, if the input shaft 12 is rotated for instance in counterclockwise direction by angle theta, the tie rods 25 move rightwardly as indicated by broken lines in FIG. 4 (b), to steer the rear wheels 27 in the direction opposite to the steering direction of the front wheels 7.

When the link member 21 is upwardly rotated by reverse rotation of the motor 31, the arm member 17 inclines with its left end up as shown in FIG. 4 (c). Due to this inclination of the arm member 17, the pivot point P is located above the axial center O and, if the input shaft 12 is rotated for instance likewise in counterclockwise direction by angle theta, the tie rods 25 move leftward, as opposed to the previous case, as indicated by broken lines in FIG. 4 (c), to steer the rear wheels 27 in the same direction as the front wheels 7.

Now the control action of the above-described embodiment will be described in the following with reference to FIGS. 5 and 6.

Figure 5:
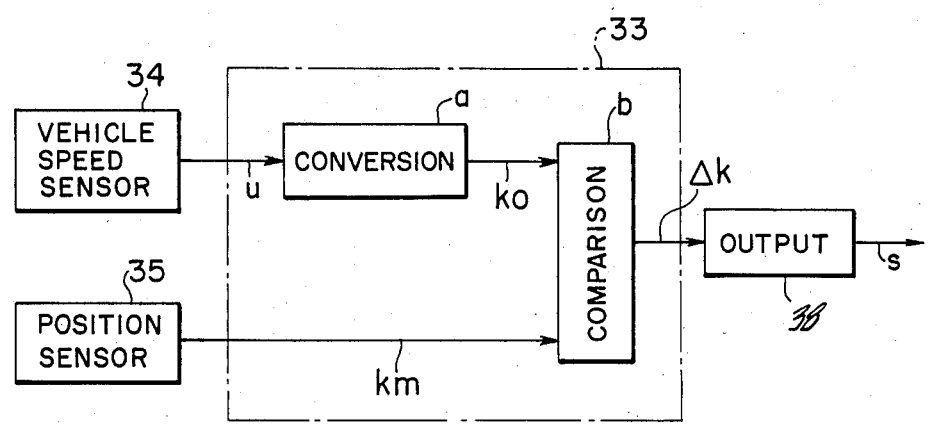
FIG. 5 is a block diagram of the control structure of the embodiment of FIGS. 1 to 3.
Figure 6:
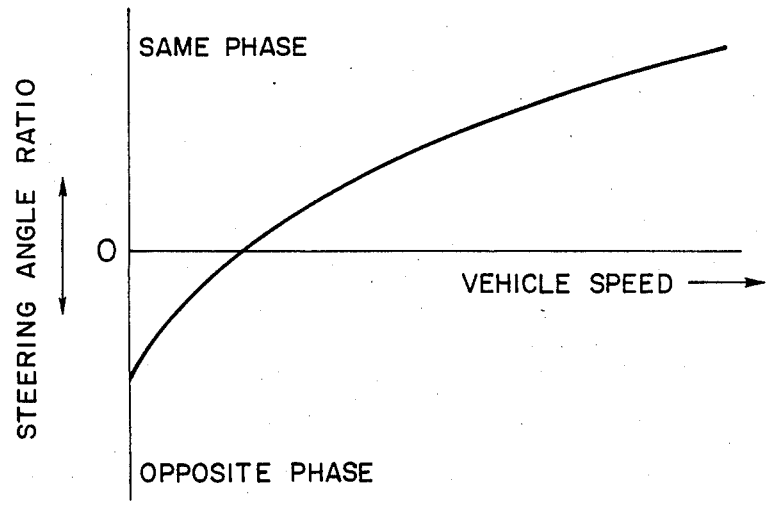
FIG. 6 is a graph showing the steering angle characteristics of the embodiment of FIGS. 1 to 4.

FIG. 5 shows the functional structure of the computer 33. The vehicle speed signal detected by the vehicle speed sensor 34 is supplied to the computer 33 as a certain vehicle speed signal u. This vehicle speed signal u is converted into a predetermined steering angle ratio signal $k_0$ (=f(u)) by a conversion process (a).

The position sensor 35 detects the rotational position of the link member 21 which is proportional to the steering angle ratio in actual steering and the detected result is supplied to the computer 33 as an actual steering angle ratio $k_m$. A relative difference delta $k=k_m-k_0$ is obtained by a comparison process (b) from the actual steering angle ratio data $k_m$ and the predetermined steering angle ratio data $k_0$. This difference delta k is supplied from the computer 33 to an output control device 38 as data corresponding to the correction of the steering angle ratio which is required to obtain the desired steering angle ratio. The output end of the output control device 38 is connected to the motor 31 and supplies thereto a control signal s corresponding to the difference delta k. Thus, the motor 31 is rotated in the direction which accomplishes the steering angle ratio according to the functional relationship shown in FIG. 6.

Thus, according to this embodiment, since a vehicle with a front and rear wheel steering device can be reduced to a conventional vehicle which can steer only the front wheels, should the front and rear wheel steering device fail for malfunction or other reasons, by manually reducing the steering angle ratio of the rear wheels for instance to zero, the reliability of the front and rear wheel steering device will be improved.

In the above-described embodiment, the various processes conducted in the computer 33 are executed by a certain program (software) stored for instance in a storage area of the computer 33, but it is possible to utilize electric circuitry having a similar functionality to perform the same processes. Further, this invention is also applicable to a front and rear wheel steering devices in which the front steering angle information is transmitted to the computer 33 as an electric signal.

Figure 7:
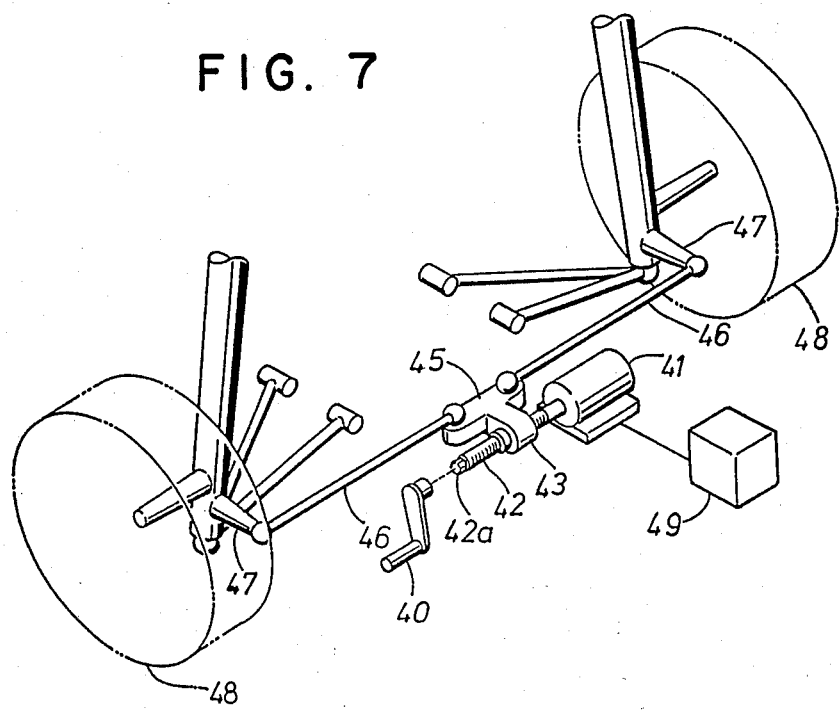
FIG. 7 is a simplified perspective view showing a rear wheel steering device to which another embodiment of the actuator for steering the rear wheels according to this invention is applied.

FIG. 7 shows a second embodiment of the actuator for steering the rear wheels according to this invention. An electric motor 41 is fixedly secured to a portion of a vehicle body adjacent to a central position of a rear part of the vehicle, and a screw rod 42 is fixedly and coaxially secured to the output shaft of the motor 41. The screw rod 42 is threadingly engaged with an internal screw thread formed in a projection 43 of a slider 45. The slider 45 is supported by the vehicle body so as to be slidable along the lateral direction and is connected to internal ends of tie rods 46 by way of ball joints. The other ends or the external ends of the tie rods 46 are connected to knuckle arms 47 of rear wheels 48 likewise by way of ball joints. A portion 42a of hexagonal cross-section is formed at the free end of the screw rod 42.

Here, the lead angle of the thread of the screw rod 42 is selected to be smaller than the friction angle thereof and the rear wheels 48 may be steered by driving the slider 45 through the rotation of the screw rod 42 but the screw rod 42 would not be driven by an external force applied to the rear wheels 48.

The motor 41 is connected to a computer 49 carried by the vehicle and is driven so as to achieve a desired steering angle in the rear wheels 48 according to a certain control program. When the motor 41 is rotatively driven, the slider 45 moves laterally by way of the screw mechanism and the rear wheels 48 can be steered.

If the action of the motor 41 is impossible for any reason and the rear wheels 48 have become stationary with a certain steering angle, it may become difficult to drive the vehicle. Therefore, in such a case, a crank handle 40 may be engaged with the hexagonal portion 42a and the screw rod 42 may be turned in the necessary direction to restore and fix the rear wheels 48 to their neutral positions. It goes without saying that other engagement means may be used in place of the hexagonal portion 42a. And, the crank handle 40 may also serve as a handle of a car jack.

Figure 8:
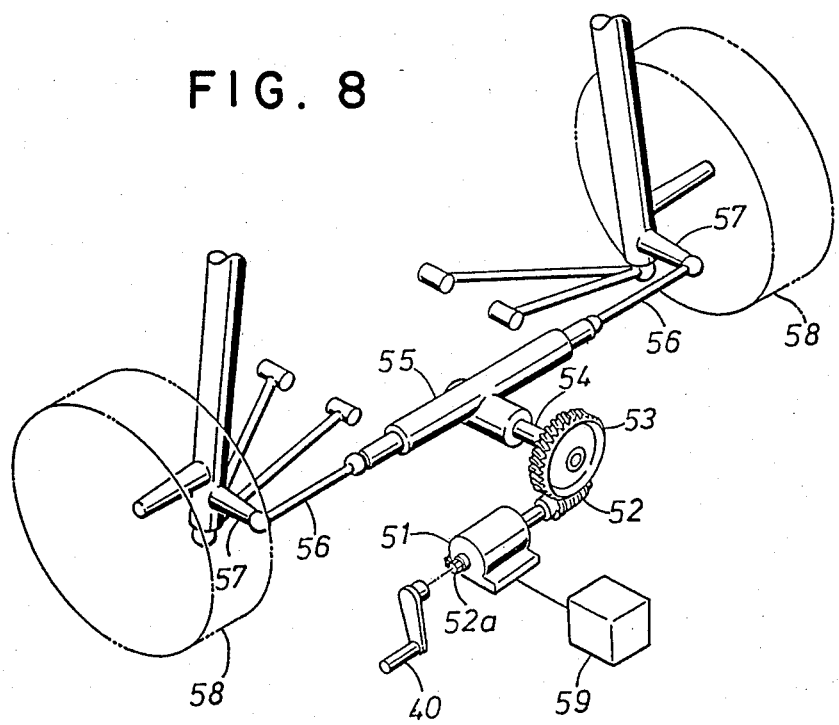
FIG. 8 is a general simplified perspective view of a rear wheel steering device to which a third embodiment of the actuator for steering the rear wheels according to this invention is applied.

FIG. 8 shows a third embodiment of the actuator for steering the rear wheels according to this invention. The output shaft of a motor 51 is provided with a worm gear 52 which in turn meshes with a worm wheel 53 mounted to a pinion shaft 54 of a rack and pinion gear device 55. The two ends of a rack shaft of the rack and pinion gear device 55 are connected to internal ends of the rods 56, respectively, by way of ball joints and the other ends of the tie rods 56 are connected to knuckle arms 57 of the rear wheels 58, respectively, likewise by way of ball joints.

The motor 51 is connected to a computer 59 carried by the vehicle and is rotatively driven so as to achieve a desired steering angle of rear wheels 58 according to a predetermined control program. When the motor 51 is rotatively driven, the rear wheels 58 are steered by the motor 51 by way of the rack and pinion gear device 55 and the tie rods 56. In this embodiment also, the advance angle of the worm gear 52 is selected to be smaller than the friction angle thereof so that the rear wheels 58 will not be steered by the external force applied thereto by driving the motor 51.

In view of the case in which the motor 51 becomes stationary for a failure thereof while the rear wheels 58 are steered in either direction, a portion 52a with hexagonal cross-section is provided at an end of the output shaft of the motor 51 so that the rear wheels 58 may be manually restored to their neutral positions by engaging a separately stored crank handle 40 with the hexagonal portion 52a and manually turning the output shaft of the motor 51 to restore the rear wheels 58 to their neutral positions.

Thus, according to these embodiments, since a vehicle with a front and rear wheel steering device can be reduced to a conventional vehicle which can steer only the front wheels even when the function of the front and rear wheel steering device is terminated for malfunction and other reasons, by manually restoring the rear wheels to their neutral positions, the reliability of the front and rear wheel steering device will be improved.

Although the present invention has been shown and described with reference to the preferred embodiments thereof, it should not be considered as limited thereby. Various possible modifications and alterations could be conceived of by one skilled in the art to any particular embodiment, without departing from the scope of the invention.

We claim:

1. A power-driven actuator for controlling a steering angle of rear wheels relative to front wheels in a front and rear wheel steering device for a vehicle which when power-driven variably controls the ratio of the steering angle of the rear wheels to the front wheels according to certain conditions, comprising:
    means for manually adjusting the actuator for positioning the rear wheels at a zero steering angle and for neutralizing the steering of the rear wheels.

2. An actuator for steering rear wheels as defined in claim 1, wherein the actuator drives a device for determining the steering angle ratio of the rear wheels relative to the front wheels.

3. An actuator as defined in claim 2, wherein the device for determining the steering angle ratio of the rear wheels comprises a clevis which is connected to a rotatable shaft transmitting a steering angle of the front wheels to a rear part of the vehicle by rotation of the shaft and clevis, the clevis also connected to internal ends of tie rods for the rear wheels, movable support means for supporting the clevis in such a manner that a relative angle of the clevis to the shaft may be varied depending on the position of the support means, an electric motor, a control means for driving the electric motor according to certain conditions, a worm gear fixedly attached to an output shaft of the electric motor and a worm wheel gear which is connected to the movable support means and meshes with the worm gear, the means for manually adjusting the actuator including engagement means connected to the output shaft of the motor and handle means adapted to be engaged to the engagement means for manually rotating the output shaft.

4. An actuator as defined in claim 3, wherein the handle means is detachable.

5. An actuator as defined in claim 1 including an electric motor, a control means for driving the electric motor according to certain conditions, a screw rod fixedly and coaxially attached to an output shaft of the electric motor and a slider which has an internal screw thread engaged to the screw rod and connected to internal ends of tie rods for the rear wheels, and the means for manually adjusting the actuator including engagement means connected to the output shaft of the motor and handle means adapted to be engaged to the engagement means for manually rotating the output shaft.

6. An actuator as defined in claim 1 including an electric motor, a control means for driving the electric motor according to certain conditions, a worm gear fixedly attached to an output shaft of the electric motor, a steering gear device for rear wheels and a worm wheel gear which is connected to an input end of the steering gear device and meshes with the worm gear, and the means for manually adjusting the actuator including engagement means connected to the output shaft of the motor and handle means adapted to be engaged to the engagement means for manually rotating the output shaft.

7. An actuator as defined in claim 5 or 6, wherein the handle means is detachable.

* * * * *